United States Patent
Rusinov et al.

(10) Patent No.: US 10,442,738 B2
(45) Date of Patent: Oct. 15, 2019

(54) CERAMIC PROPPANT AND METHOD FOR PRODUCING SAME

(71) Applicant: «NIKA-PETROTECH» Limited Liability Company, Yekaterinburg (RU)

(72) Inventors: Pavel Gennadievich Rusinov, Yekaterinburg (RU); Aleksey Vladimirovich Balashov, Yekaterinburg (RU)

(73) Assignee: «NIKA-PETROTECH» Limited Liability Company, Yekaterinburg (RU)

(*) Notice: Subject to any disclaimer, the term of this patent is extended or adjusted under 35 U.S.C. 154(b) by 0 days.

(21) Appl. No.: 16/072,570

(22) PCT Filed: Feb. 8, 2017

(86) PCT No.: PCT/RU2017/000062
§ 371 (c)(1),
(2) Date: Jul. 25, 2018

(87) PCT Pub. No.: WO2017/142439
PCT Pub. Date: Aug. 24, 2017

(65) Prior Publication Data
US 2019/0031568 A1  Jan. 31, 2019

(30) Foreign Application Priority Data
Feb. 19, 2016 (RU) .................. 2016105796

(51) Int. Cl.
| | |
|---|---|
| *C09K 8/80* | (2006.01) |
| *C04B 35/626* | (2006.01) |
| *C04B 35/20* | (2006.01) |
| *C04B 35/64* | (2006.01) |
| *C04B 35/195* | (2006.01) |
| *C04B 35/26* | (2006.01) |
| *C04B 35/82* | (2006.01) |
| *E21B 43/26* | (2006.01) |

(52) U.S. Cl.
CPC ...... *C04B 35/62695* (2013.01); *C04B 35/195* (2013.01); *C04B 35/20* (2013.01); *C04B 35/2625* (2013.01); *C04B 35/6268* (2013.01); *C04B 35/62655* (2013.01); *C04B 35/64* (2013.01); *C04B 35/82* (2013.01); *C09K 8/80* (2013.01); *C04B 2235/3274* (2013.01); *C04B 2235/349* (2013.01); *C04B 2235/3418* (2013.01); *C04B 2235/658* (2013.01); *C04B 2235/661* (2013.01); *C04B 2235/77* (2013.01); *C04B 2235/80* (2013.01); *C04B 2235/96* (2013.01); *E21B 43/26* (2013.01)

(58) Field of Classification Search
CPC . C04B 35/62695; C04B 35/195; C04B 35/20; C04B 35/62655; C04B 35/6268; C04B 35/64; C04B 2235/3418; C04B 2235/349; C09K 8/80; E21B 43/26; E21B 43/16
See application file for complete search history.

(56) References Cited

U.S. PATENT DOCUMENTS

| | | | | |
|---|---|---|---|---|
| 2002/0061811 | A1* | 5/2002 | Merkel | C04B 35/447 501/106 |
| 2008/0070774 | A1 | 3/2008 | Shmotev et al. | |
| 2009/0038797 | A1* | 2/2009 | Skala | C09K 8/80 166/280.1 |
| 2011/0111990 | A1* | 5/2011 | Pershikova | C04B 35/01 507/219 |
| 2011/0301067 | A1* | 12/2011 | Plotnikov | C04B 35/20 507/269 |

* cited by examiner

*Primary Examiner* — Silvana C Runyan
(74) *Attorney, Agent, or Firm* — Nadya Reingand; Yan Hankin

(57) ABSTRACT

The invention relates to a method for producing a ceramic proppant, including a step for preparing an original charge material, involving the grinding of source materials, particularly magnesium-containing materials, and auxiliary materials, thus producing a charge material, granulating the charge material so as to produce granules of a proppant precursor, and firing the granules of proppant precursor, thus producing proppant granules, wherein the method includes a step for pre-firing the magnesium-containing material in a reducing atmosphere. The invention also relates to a ceramic proppant produced via the indicated method.

20 Claims, No Drawings

CERAMIC PROPPANT AND METHOD FOR PRODUCING SAME

CROSS-REFERENCE TO RELATED APPLICATIONS

The present patent application is a National stage application of the PCT application PCT/RU2017/000062 filed Feb. 8, 2017 which claims priority to Russian application RU 2016105796 filed Feb. 19, 2016.

TECHNICAL FIELD

The invention relates to the field of the oil-and-gas producing industry, namely to the manufacturing technology of ceramic proppants intended for use in the oil or gas production by method of hydraulic fracturing (HF) of a formation.

BACKGROUND

Hydraulic fracturing is a way of increasing the productivity of wells in the extraction of oil or gas. It involves injection of fluids into an oil-bearing or gas-bearing subterranean formation at sufficiently high rates and pressures to form cracks in the formation that increase the flow of fluids from the oil or gas reservoir into the well.

To maintain cracks in the open state, mechanically strong proppants, which do not react with the borehole fluid, are injected into them. These propping agents are spherical granules (proppants), which penetrate the fracture with the fluid and, at least partially, fill it creating a strong propping frame, permeable for oil and gas being released from the formation.

In general, the proppant is a solid material designed to maintain induced hydraulic fracture in its open state during or after the process of hydraulic fracturing. For hydraulic fracturing to be carried out, proppants are added to the well treatment fluids, which are then being inserted into the subterranean formations. Well treatment fluids can vary in composition depending on a type of formation. Traditional proppants include materials such as sand (the most common type), nutshells, aluminum and aluminum alloys, crushed charred coal, granulated slag, coal dust, crushed stone, granules of metal such as steel, sintered bauxite, sintered alumina, refractory materials, such as mullite and glass granules, as well as artificial ceramic materials and polymers.

The importance of selecting a material, which is suitable for a particular well, is due to the fact that the proppants should resist not only a high reservoir pressure tending to deform the proppant particles, which may lead to the crack closure, but also bear the influence of the aggressive wellbore media (moisture, acid gases, saline solutions) at high temperatures.

It was discovered that ceramic proppants generally have advantageous characteristics with respect to many other types of materials, for example in relation to their durability and uniformity in size and shape.

However, while the ceramic proppants are sufficiently durable and effective and can be produced in economically efficient ways, it is necessary to create new proppants having improved mechanical characteristics such as durability, permeability, specific weight (bulk density), hydrothermal stability and acid resistance, as well as effective methods for producing them.

There are technical decisions for producing proppants, namely, the propping agent (U.S. Pat. No. 5,188,175), which is represented by ceramic granules of a spherical shape made of sintered kaolin clay containing oxides of aluminum, silicon, iron and titanium, where the oxides in these granules are present in the following ratios, wt %:aluminum oxide—25-40, silicon oxide—50-65, iron oxide—1.6 and titanium oxide—2.6. However, this proppant has insufficient durability and is only intended for intermediate depth wells with a pressure of less than 8000 psi.

In addition, a method for producing ceramic proppants made of magnesium-silicate material with a forsterite content of 55 to 80% wt/wt is known from the Russian Federation Patent No. 2235703 C1. According to this process, the original ceramic material based on forsterite is being grinded, granulated and fired at a temperature of 1150 to 1350° C.

The disadvantage of the known method is that under hydrothermal conditions, forsterite becomes partially hydrated, therefore the mechanical durability of the proppant granules reduces significantly.

In the Russian Federation Patent No. 2235702 C2, a similar process is shown wherein the magnesium-silicate precursor consists of magnesium metasilicate with about 40% wt/wt of MgO and about 60% wt/wt of $SiO_2$. Due to the very narrow sintering range ($\Delta T_{max}$ from 10 to 20° C.), the production of such proppants is difficult and expensive. In addition, due to the narrow range of sintering temperature, firing in a rotary kiln under standard industrial conditions will result in underburned porous proppant particles and overburned fused proppant particles.

Thus, the actually achieved durability, acid resistance and hydrothermal stability of the propping agents obtained under industrial conditions are noticeably lower than those for batches obtained under laboratory conditions. Moreover, the narrow sintering range requires a greater curing time for the proppant material at the sintering temperature to achieve a uniform temperature distribution. This leads to the growth of magnesium metasilicate crystals and phase transformation during the cooling process, which also reduces the quality of the resulting proppant.

Thus, the disadvantage of the known method and the product obtained therefrom is that the resulting proppant has got the reduced mechanical characteristics, in particular durability values, which also leads to a decrease in permeability of the proppant layer at elevated pressures.

The object of the present invention is to provide the ceramic proppant (proppant particles) with high operating performance characteristics and low production cost.

In particular, the object of the present invention is to provide a new proppant with improved properties and an economical and energy-efficient method for producing a ceramic proppant, which allows to obtain a proppant with increased durability, reduced bulk density, good permeability, hydrothermal stability, and acid resistance.

SUMMARY

The objectives are achieved by obtaining the ceramic proppant in accordance with the new method for producing a ceramic proppant, allowing the internal structure of the agent to be modified to give it advantageous properties.

In one aspect, the present invention relates to the process for producing a ceramic proppant comprising:
  a) preparation, including grinding of source materials containing magnesium-containing material and auxiliary materials to produce a charge material;

b) granulating the charge material to produce proppant precursor granules; and c) firing the proppant precursor granules to obtain proppant granules;

wherein an important feature of the above method is the pre-firing step of the magnesium-containing material in the reducing atmosphere.

In another aspect, the present invention relates to the ceramic proppant produced by the above production process.

In a further aspect, the present invention relates to the ceramic proppant characterized by an enstatite content of 50 to 80 wt % and magnesioferrite content of 4 to 8 wt %.

In addition, the present invention relates to a method for treating a subterranean formation, comprising a) providing the ceramic proppant;

b) mixing said ceramic proppant with a HF fluid (a fluid for hydraulic fracturing of a formation);

c) injecting the mixture from the step b) into the subterranean formation.

Also, in one of the aspects, the present invention relates to using the ceramic proppant for hydraulic fracturing of a subterranean formation.

DETAILED DESCRIPTION OF THE INVENTION

The present invention relates to the method for producing a proppant and the proppant, which has the improved performance characteristics and can be obtained by using inexpensive and procurable ceramic materials.

In the present description, the propping agent or the proppant is a granular material, in particular, ceramic granules of a substantially spherical shape. A magnesium-containing material, in particular, minerals based on magnesium silicates and possibly iron (may also be referred to as magnesium-silicate materials or magnesia-containing materials) can be used as an original material for preparing the proppant by grinding, granulating and firing. Non-limiting examples of such materials can be represented by various peridotite minerals including olivines, dunite, serpentinite being used as source materials for the production of ceramic proppants, as well as the minerals forsterite, enstatite, fayalite, etc. that are present in them or formed as a result of firing. Materials and additives used as auxiliary materials are, for example, siliceous components, such as quartz sand, hydromicaceous and montmorillonite clays or refractory clays.

The size of granules of the resulting proppant is usually 0.4-1.7 mm. This size is not limiting and the granules of any size can be produced, depending on a specific field of application or requirements for a specific well. In general, the proppant granules should meet the following characteristics: bulk density in the range of 1.3 to 1.9 g/cm$^3$, integrity and permeability retention at pressures from 5000 to 15000 psi, sphericity and roundedness, acid resistance as described in the Russian State Standard ГОСТ Р 54571-2011 "Magnesia-quartz proppants".

According to the proposed method for producing a proppant, in the first step a), the preparation, for example, grinding or milling, of source materials containing a magnesium-containing material and auxiliary materials such as silica-containing components, for example quartz sand, is carried out to obtain a charge of source materials. Thus, according to the method, the step a) of preparing the source materials may include grinding, for example, milling of source materials. According to the proposed method, an amount of the original magnesium-containing material in the charge is from 45 to 70 wt % and an amount of auxiliary materials is up to 55 wt %, in particular the charge material may contain quartz sand in an amount of 30 to 55 wt % of the charge material weight, hydromicaceous and/or montmorillonite clays in an amount from 0 to 10 wt % of the charge material weight, and refractory clays in an amount from 0 to 10 wt % of the charge material weight.

The grinding process can be carried out by any method known to those skilled in the art. Preferably, the grinding is carried out in ball-tube mills. It is also preferred that co-grinding of the magnesium-containing material and the auxiliary material is carried out. Prior to grinding, the auxiliary materials can be pre-dried, in particular the quartz sand is usually dried in a drying drum or similar appliances to a moisture content of less than 1%. It is preferable that the materials are being grinded to a maximum particle size of less than 40 μm, and at least 50% of particles should be less than 10 μm in size.

The step a) of the preparation of source materials can also include mixing the ground source materials with water to form a slurry. This slurry with a moisture content of 33-40% can be further milled, for example, in wet milling balls to a maximum particle size of less than 30 μm. After that the resulting slurry is dried, for example, in drying spray towers (DST) to obtain a charge material (moulding powder) with a moisture content of 13-20%. A detailed description of the techniques for the preparation of source materials and compositions to obtain ceramic products can also be found in the following books: Strelov, K. K. and Mamykin, P. S., *Refractory Technology*. 4th edition, revised and enlarged, Moscow, Metallurgiya Publishing House, 528 pages (1988); Balkevich, V. L., *Technical Ceramics*. Publishing House for Literature on Construction. Moscow (1968); Nokhratyan, K. A., *Drying and Firing in the Building Ceramics Industry*. State Publishing House for Literature on Construction, Architecture and Building Materials. Moscow (1962).

The preparation step is followed by the step b) of granulating the charge material to produce proppant precursor granules with a certain granule size, for example of 0.5 to 2 mm. Granulation can be carried out by any method and by means of any equipment known to those skilled in the art. One of the examples of suitable equipment are plate granulators.

The method may optionally comprise drying and sizing (fractionation) of the proppant precursor granules, involving separating and returning the granules, which do not match the performance, to the step a) of preparation. Before firing, the mixture is usually divided into several fractions—0.5-0.8 mm, 0.7-1.0 mm, 0.9-1.2 mm, 1.1-1.7 mm or 1.6-2.0 mm, each of the fractions is being fired separately. The description of methods and equipment for granulation can also be found in the book by Kochetkov, V. N., *Granulation of Mineral Fertilizers*. Moscow, Khimiya Publishing House, 224 pages (1975) (Кочетков В. Н., Гранулирование минеральных удобрений, М., "Химия", —1975, 224 с.).

The final step in obtaining the proppant is the step c) of firing the proppant precursor granules. The firing is generally carried out at a temperature from about 1200° C. to about 1350° C. for a period of time sufficient to ensure the producing of spherical ceramic granules. The specific time and temperature will vary depending on the source material being used and the particular equipment. The optimum time and temperature for firing a particular composition of the source material can be determined empirically in accordance with the results of physical tests for the resulting granules obtained after the firing process. The firing process is carried out in an oxidizing atmosphere. For example, the firing can be carried out in a traditional rotary kiln. The description of the firing equipment can also be found in the book by Mamykin, P. S., Levchenko, P. V., Strelov, K. K., *Furnaces and Dryers of Refractory Plants*. State Scientific and Technical Publishing House for Literature on Ferrous and Non-Ferrous Metallurgy, Sverdlovsk Branch, Sverdlovsk (1963). On completion, the proppant granules of the required size can be separated and the marketable product will be packed in a storage receptacle.

The inventors unexpectedly found out that ceramic proppants with better performance characteristics, particularly with increased durability, permeability and reduced bulk density, can be obtained by carrying out an additional pre-firing step, i.e., by heat treatment of the magnesium-containing material in a reducing atmosphere. The pre-firing process is generally performed to remove chemically bound moisture (dehydration) from the original minerals in order to facilitate granulation and final firing process. However, it was discovered that its realization in a reducing atmosphere is associated with the final products having improved properties.

Thus, the method according to the present invention includes the pre-firing step of the magnesium-containing material in a reducing atmosphere.

According to a preferred option for implementation, the pre-firing step is carried out prior to the step a) of preparing the source materials. The inventors have found out that applying the pre-firing process prior to the step a) may be preferable in reducing energy consumption for grinding the magnesium-containing material due to loosening the magnesium-containing material during the pre-firing process.

Then, in the method according to the present invention, the pre-firing step is conducted at a temperature from about 900° C. to about 1100° C. in a reducing atmosphere. In the present method, a reducing (weakly reducing) atmosphere means a reaction medium (atmosphere) with an oxygen content of less than 5 wt %, preferably less than 2-3 wt %. The reducing atmosphere in the pre-firing area can be provided by introducing a carbon-containing additive selected from the group, comprising, for example, natural gas, coal, charred coal or mixtures thereof. However, it should be noted that the proposed method is not limited to these additives, and one skilled in the art can use any means and techniques to provide a reducing atmosphere in the firing area.

The pre-firing step can be carried out in any firing kilns known to those skilled in the art; however, it is preferable to use furnaces of a shaft type, since it is impossible to create a reducing atmosphere in a common rotary kiln.

Conduction of pre-firing process in shaft furnaces is accompanied by a spreading air supply to maintain combustion in the furnace areas. A portion of air flow is fed through a discharge grate at the bottom of the furnace; another portion of air is supplied through additional openings above the firing area. A natural gas or another agent or additive providing a reducing atmosphere in the reaction area is supplied to the combustion area as defined herein. Preliminary firing in a shaft furnace is also characterized by a low specific energy consumption and a reduction in dust losses compared to firing a magnesium-containing material in rotary kilns.

Without being bound by any particular theory, the inventors believe that improving the proppant characteristics is due to the following factors.

The inventors have found out that during the pre-firing process at temperatures below 900° C., the complete dehydration of the magnesium-containing material (dunite, olivine, serpentinite, etc.) does not take place; and at temperatures above 1100° C., unwanted reactions can occur, for example, in the dunite (olivines), the fayalite ($Fe_2SiO_4$), including FeO contained in the fayalite, can react with MgO to form magnesioferrite. In this case, the formation of the magnesioferrite during the pre-firing step is undesirable, since magnesioferrite increases the durability of the material and, therefore, makes it difficult to grind the source materials during the step of obtaining the charge material. In addition, the magnesioferrite is a passivation element, which does not participate in the formation of a given structure during the final firing of the proppant precursor granules. Thus, pre-firing in a reducing atmosphere helps prevent unwanted oxidation of FeO, and, as a consequence, formation of magnesioferrite prior to the final firing step.

Carrying out preliminary dehydration firing in a reducing atmosphere leads to the fact that the iron oxide (FeO), which is present in the mineral material, does not turn into $Fe_2O_3$ or $Fe_3O_4$ and remains in a solid solution with magnesium oxide (MgO).

The characteristics of the proppant, especially the durability, are improved as a result that, along with the quartz, other crystalline phases—enstatites with embedded magnesioferrites are formed during the final firing of the proppant precursor granules in the oxidizing atmosphere.

When pre-firing dunite, the serpentinites and olivines are being thermally decomposed, which is accompanied by formation of forsterite and enstatites and removal of chemically bound moisture, namely $$(Mg_{n1},Fe_{m1})_2SiO_4 \rightarrow (Mg_{n2},Fe_{m2})_2SiO_4 + (Mg_{n3},Fe_{m3})_2SiO_3,$$

where $n_1 = n_2 + m_2 = n_3 + m_3 = 1$ and $n_1 < n_2$, but $m_1 > m_2$;

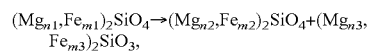

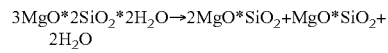

At the same time, the iron oxide FeO remains in the form of a solid solution of magnesium oxides and iron oxides MgO*FeO.

The thermal decomposition of serpentinite begins at temperatures above 700° C., the process intensifies with the temperature increase. The material thus loosens, which, as mentioned earlier, allows to increase productivity when grinding.

Further, the crystallization of enstatites and forsterite begins, which leads to increased durability of the material.

During the final firing of the product, forsterite, iron oxide and quartz oxide react together to form the crystalline lattice of enstatite with magnesioferrite embedded in it:

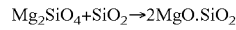

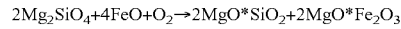

In other words, the inventors believe that incorporation into the crystal lattice of FeO, which is more active than $Fe_2O_3$, makes it possible to obtain a stronger structure. In addition, the inventors also discovered that the eutectic $Mg_2SiO_4$—$MgFe_2O_4$ has a lower fusing temperature and, consequently, reduces the cost of energy sources when firing the final product.

Thus, according to the present invention, because of the final firing, the resulting proppant can be characterized by a content of magnesium-containing material, in particular of 50 to 80 wt % of enstatite (clinoenstatite) and 4-8 wt % of magnesioferrite. The composition of the finished proppant may also include magnetite in an amount of 0.5-2 wt %. The remainder may consist of diopside, pyroxene, quartz and other minerals, depending on the presence of impurities in the sand and magnesium-containing material.

Studies conducted by the inventors brought out that a proppant characterized by an enstatite (clinoenstatite) content of 50 to 80% and a magnesioferrite content of 4-8% has advantageous properties, namely, a significantly higher durability, reduced bulk density, good permeability, as well as hydrothermal stability.

Therefore, the present invention also relates to the ceramic proppant produced by the method described above.

The invention also relates to the method for treating a subterranean formation using the resulting ceramic proppant comprising: a) providing a ceramic proppant; b) mixing said ceramic proppant with a HF fluid (a fluid for hydraulic fracturing of a formation); c) injecting the mixture into a subterranean formation.

The high-viscous water base fluid used in hydraulic fracturing is usually subjected to additional thickening by means of high-molecular natural resins such as galactomannan or glucomannan resins (guar), karaya acacia gum, tragacanth, etc., natural polysaccharides such as, for example, starch, cellulose and their derivatives. The operating fluid must be chemically stable and viscous enough to keep the proppant in a suspended state while it undergoes shear deformations and heating in the ground equipment, in the wellbore system, in the perforation channels and in the crack itself to avoid premature proppant deposition and, as a result, closure of a crack. The HF fluid composition may contain "crosslinkers" of the linear gel; destructors providing controlled degradation of a highly viscous polymer to a liquid fluid for a simplified intake of the HF fluid from the well, as well as heat stabilizers, pH adjusting additives, surfactants, bactericides, emulsifiers and demulsifiers, infiltration reducing additives, clay stabilizers etc.

Thus, the present invention also relates to the use of the ceramic proppant intended for fracturing a subterranean formation.

DETAILED DESCRIPTION OF THE PREFERRED EMBODIMENT

Further, the invention will be illustrated with the reference to the following non-limiting examples. Test samples of the proppant with dunite and serpentinite, which were used as a source magnesium-containing material and heat-treated in various ways, were obtained and studied.

COMPARISON EXAMPLE 1

Dunite was preliminarily fired in a laboratory furnace at the temperature of 1000° C. in an oxidizing atmosphere, then ground together with quartz sand and fusible clay in the ratio of 48:48:4 weight percent to a size of 40 µm or less. After that, the obtained material was granulated with a laboratory granulator to a fraction of 1.1-1.7 mm. The material was dried at 120° C., fired at various temperatures and scattered. Qualitative indicators were tested in accordance with the requirements of ISO 13503-2:2006 for crushing resistance (mass fraction of broken granules) at the specific pressure of 10 000 psi and the bulk density was determined. The indicators are given in the Table 1.

COMPARISON EXAMPLE 2

As the magnesium-containing component, dunite was used, which was preliminarily fired at a temperature of 1250-1300° C. in an oxidizing atmosphere in a rotary kiln. The samples were made as in the Example 1.

COMPARISON EXAMPLE 3

As the magnesium-containing component, serpentinite was used, which was preliminarily fired at a temperature of 1250-1300° C. in an oxidizing atmosphere in a rotary kiln. The samples were made as in the Example 1.

EXAMPLE 4

As the magnesium-containing component, dunite was used, which was preliminarily fired at a temperature of 950-1050° C. in a reducing atmosphere in a shaft furnace. The samples were made as in the example 1.

EXAMPLE 5

As the magnesium-containing component, dunite was used, which was preliminarily fired at a temperature of 950-1050° C. in a reducing atmosphere in a shaft furnace. The samples were made as in the Example 1 at the ratio of dunite, sand and clay of 65:30:5 weight percent.

TABLE 1

| No. | Source Charge Constituents, wt % | Pre-firing Temperature, ° C. | Firing Temperature of the Final Product, ° C. | Bulk Density of Raw Material, g/cm$^3$ | Crushing Resistance at the Specific Pressure of 10 000 psi, % |
|---|---|---|---|---|---|
| | Dunite, Laboratory Firing - 48 | 1000 | 1300 | 1.52 | 18.6 |
| | Quartz Sand - 48 | | 1310 | 1.54 | 17.6 |
| | Fusible Clay - 4 | | 1320 | 1.57 | 17.2 |
| | | | 1330 | 1.56 | 20.1 |
| | Dunite in a Rotary Kiln - 48 | 1250-1300 | 1280 | 1.55 | 20.4 |
| | Quartz Sand - 48 | | 1300 | 1.57 | 16.1 |
| | Fusible Clay - 4 | | 1320 | 1.57 | 18.6 |
| | Serpentinite - 48 | 1250-1300 | 1300 | 1.49 | 23.6 |
| | in a Rotary Kiln | | 1310 | 1.50 | 20.3 |
| | Quartz Sand - 48 | | 1320 | 1.53 | 19.5 |
| | Fusible Clay - 4 | | 1330 | 1.56 | 19.7 |
| | | | 1340 | 1.57 | 23.5 |
| | Dunite in a Shaft Furnace - 48 | 950-1050 | 1280 | 1.55 | 15.9 |
| | Quartz Sand - 48 | | 1300 | 1.57 | 15.1 |
| | Fusible Clay - 4 | | 1320 | 1.58 | 16.7 |

TABLE 1-continued

| No. | Source Charge Constituents, wt % | Pre-firing Temperature, ° C. | Firing Temperature of the Final Product, ° C. | Bulk Density of Raw Material, g/cm³ | Crushing Resistance at the Specific Pressure of 10 000 psi, % |
|---|---|---|---|---|---|
| | Dunite in a Shaft Furnace - 65 | 950-1050 | 1300 | 1.58 | 15.3 |
| | Quartz Sand - 30 | | 1320 | 1.60 | 14.6 |
| | Fusible Clay - 5 | | 1340 | 1.61 | 16.2 |

As can be seen from the table results, changing the pre-firing modes affects the qualitative indicators of the final product and the preliminary heat treatment in the shaft furnace has made it possible to obtain more durable proppants.

EXAMPLE 6

The finished samples were additionally examined to determine the quantitative phase composition by means of the ART 9900 Workstation X-Ray Fluorescence Spectrometer with an integrated diffraction system.

In the samples from the Examples 1-3, the content of enstatites was 63.8-67.9% and the content of magnesioferrites was 2.4-3.6%. At the same time, magnetites in the amount of 3.1-4.5% are present in the phase composition.

In the samples from the Examples 4 and 5, the content of enstatites was 66.3% and 74.6% respectively, the content of magnesioferrites was 5.2-5.6%, and the content of magnetite was 0.8-1.5%. The high content of magnesioferrites and the low content of magnetite indicates the more complete reaction on the intrusion of iron into the crystal lattice of enstatite.

What is claimed is:

1. A method for producing a ceramic proppant, comprising steps of:
   a) pre-firing source materials, said source materials comprising magnesium-containing material, in a furnace having an atmosphere with an oxygen content of 0.001 to 5 weight percent, said atmosphere being maintained by introducing a carbon-containing additive,
   (b) preparation of a charge material, said preparation of the charge material including grinding said pre-fired source materials with auxiliary materials;
   (c) granulating the charge material to produce proppant precursor granules; and
   (d) firing the proppant precursor granules to produce proppant granules.

2. The method according to claim 1, wherein the pre-firing step is carried out at a temperature from about 900° C. to about 1100° C.

3. The method according to claim 1, wherein the step (b) of preparing the charge material comprises co-grinding the magnesium-containing material and the auxiliary material.

4. The method according to claim 1, wherein the step (b) of preparing the charge material further comprises mixing ground source materials with water to form a slurry, and drying and grinding the slurry to obtain the charge material.

5. The method according to claim 1, further comprising fractionation of the proppant granules.

6. The method according to claim 1, further comprising drying and fractionation of the proppant precursor granules.

7. The method according to claim 1, wherein the atmosphere has an oxygen content of less than 3 wt %.

8. The method according to claim 7, wherein the carbon-containing additive comprises natural gas, coal, charred coal, or mixtures thereof.

9. The method according to claim 1, wherein the pre-firing step (a) is carried out in shaft furnaces.

10. The method according to claim 1, wherein the magnesium-containing material is a material based on a magnesium silicate selected from peridotites.

11. The method according to claim 1, wherein the step (d) of firing the magnesium-containing material proppant precursor granules is carried out at a temperature from about 1200° C. to about 1350° C.

12. The method according to claim 1, wherein the auxiliary material comprises silica-containing components, including quartz sand, hydromicaceous clays, montmorillonite clays, and refractory clays.

13. The method according to claim 1, wherein the charge material contains 45 to 70 wt % of the magnesium-containing material.

14. The method according to claim 13, wherein the auxiliary materials comprise quartz sand in an amount from 30 to 55 wt % of the charge material weight and clay in an amount from 0 to 10 wt % of the charge material weight.

15. The method of claim 1, wherein the proppant granules comprise enstatites with embedded magnesioferrites.

16. A ceramic proppant produced by the method according to claim 1.

17. The ceramic proppant according to claim 16, comprising an enstatite content of 50 to 80 wt % and a magnesioferrite content of 4 to 8wt %.

18. The ceramic proppant according to claim 17, wherein the enstatite is clinoenstatite.

19. The ceramic proppant according to claim 17, further comprising magnetite of 0.5 to 2 wt %.

20. A method of using the ceramic proppant according to claim 16, comprising:
   providing the ceramic proppant for hydraulic fracturing of a subterranean formation.

* * * * *